Jan. 23, 1968 — L. C. WHITON ET AL — 3,364,656
METHOD FOR EFFECTING COUNTERCURRENT CONTACTING OF GAS AND LIQUID STREAMS
Filed Dec. 16, 1964
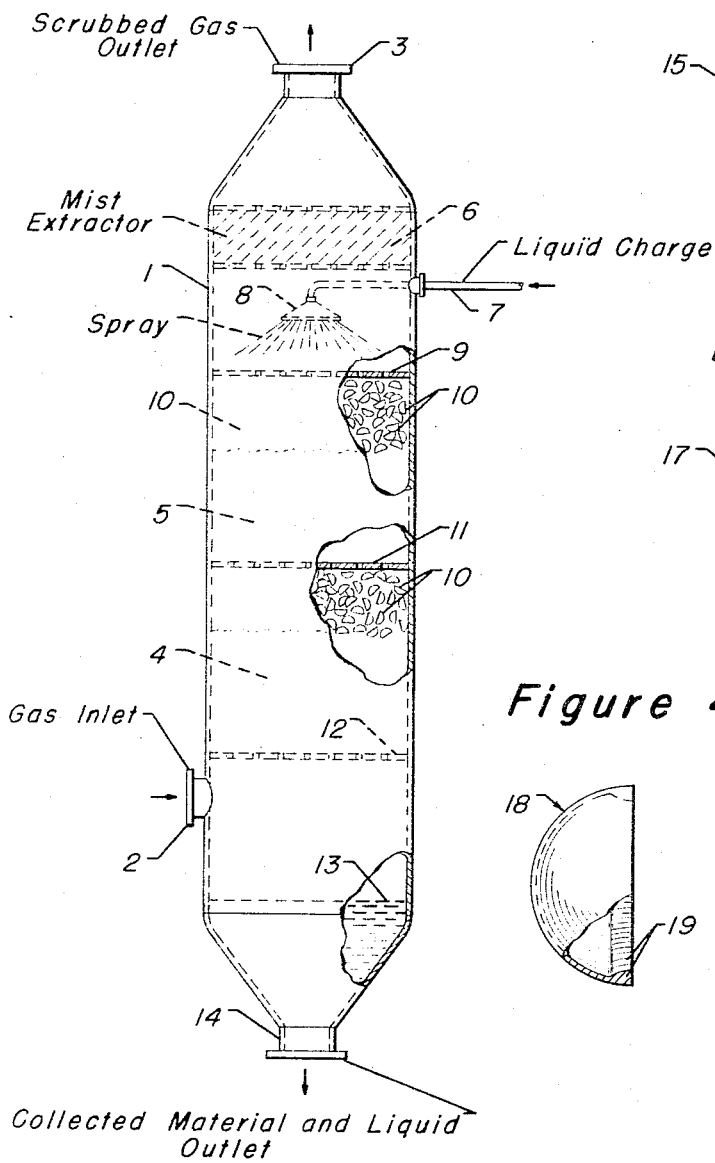
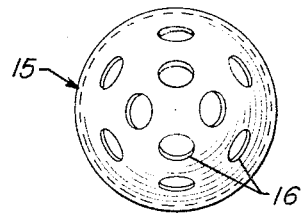
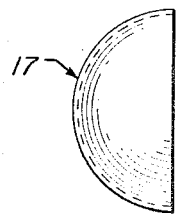
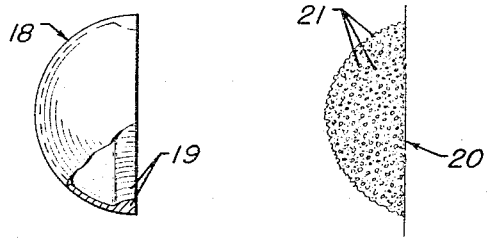
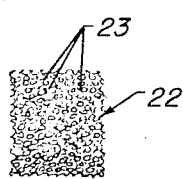
INVENTORS:
Louis C. Whiton
Alfred Arnold Petersen
BY:
ATTORNEYS

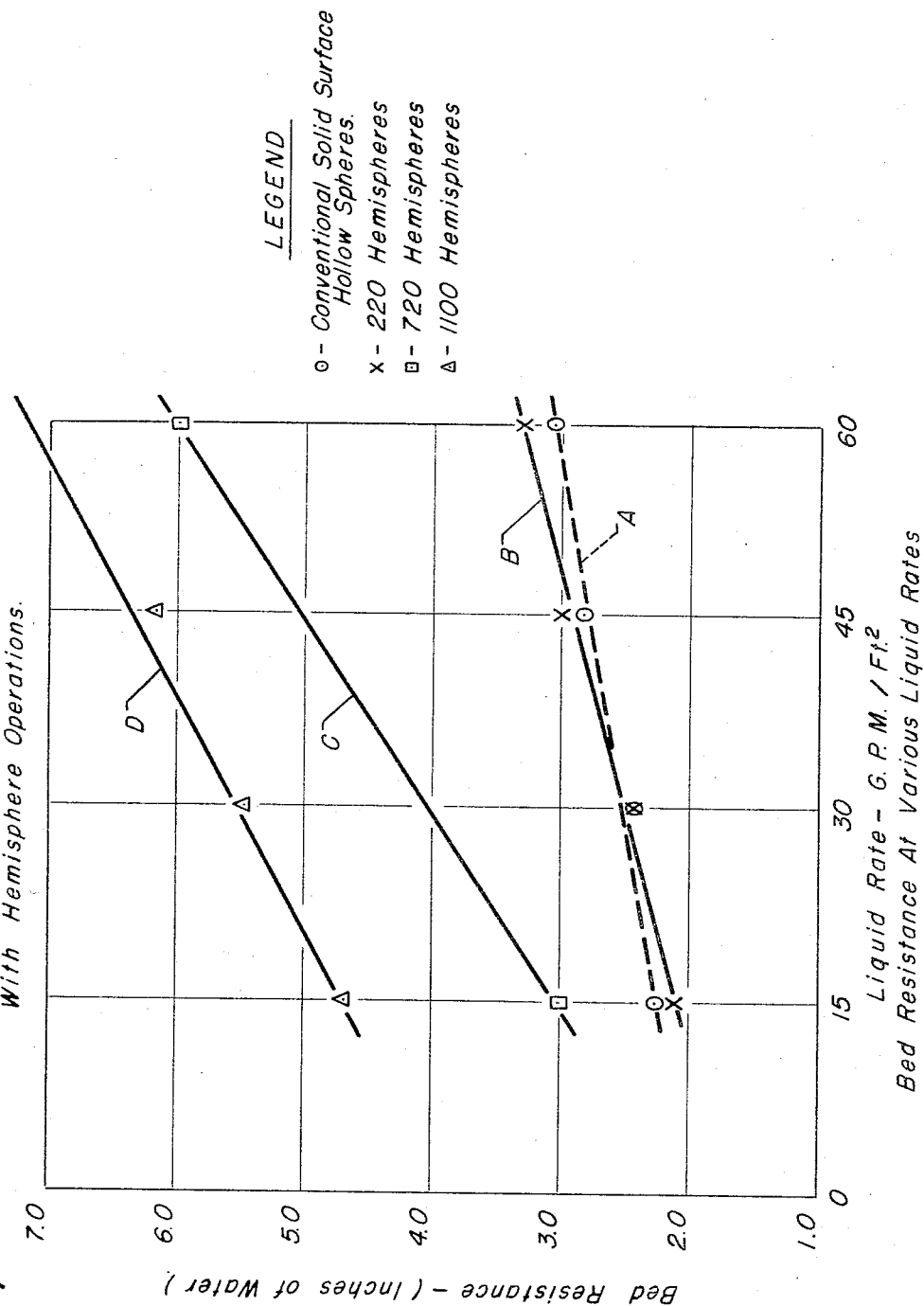

United States Patent Office 3,364,656
Patented Jan. 23, 1968

3,364,656
METHOD FOR EFFECTING COUNTERCURRENT CONTACTING OF GAS AND LIQUID STREAMS
Louis C. Whiton, Westport, and Alfred Arnold Petersen, Greenwich, Conn., assignors to Universal Oil Products Company, Des Plaines, Ill., a corporation of Delaware
Filed Dec. 16, 1964, Ser. No. 418,798
4 Claims. (Cl. 55—91)

ABSTRACT OF THE DISCLOSURE

Countercurrent contacting of gas and liquid streams with the use of large surface area open contact elements which will provide both exterior and interior contact surfaces and in addition can be utilized in a floating bed manner to effect the turbulence and mutual contact between gas and liquid streams in a countercurrent flow, such elements preferably being in open hemispherical form.

---

There are, of course, many types of towers with various forms of packing, as well as towers or columns which utilize special contacting decks or trays that may be used for the countercurrent contacting of gas and liquid streams. The tray or bubble deck towers are not always adapted to provide the necessary absorption or scrubbing characteristics, being generally less suitable than packed towers for certain functional requirements. On the other hand, there are certain disadvantages in the use of packed towers. For example, there is a tendency for gaseous and liquid streams to channel through the packing especially with low liquid flow rates. There is also a disadvantage in the use of packed beds when there is any large quantity of entrained particles in either of the streams which can effect a rapid clogging of the packing within the tower.

In view of the foregoing disadvantages, there has come into commercial use apparatus and process means for using lightweight floating and moving beds of contact elements which can provide a surface for turbulence and mutual contact between countercurrent flowing streams. It may be noted that this floating bed type of operation and apparatus has been disclosed in A. W. Kielback United States Patent No. 3,122,594, entitled "Apparatus and Procedure for Contact Between Fluids." This patent teaches the use of lightweight spherical balls of plastic or synthetic resins, although in some cases it is indicated that the spheres might be of thin lightweight metal. In any event, the concept has utilized contact members with impervious walls as well as with a resulting low density in order to permit the gas stream to effect the turbulent lifting of the bed of contact elements upwardly against a superimposed grid plate.

In connection with the use of small spherical contact elements, it has been found that when operating under pressure there frequently occurs a leakage of liquid into some of the spheres thereby causing them to have a weight change and lose their ability to be floated as a part of the turbulent bed of elements. Still another disadvantage resides in the cost of fabrication. Even hollow plastic or resin types of material may have some form of seam in the fabrication of a sphere, while with metal spheres, and especially stainless steel, there is almost a prohibitive cost in effecting the production of a relatively small number of welded hollow sphere members.

It is thus a principal object of the present invention to provide for the use of light weight contact elements which are at least partially open. In other words, the improved forms of contact elements have sufficient wall opening or perforation to permit both liquid and gaseous streams to rapidly enter and leave their interiors so as to make use of additional internal contact surfaces without retaining sufficient liquid to unfavorably effect their weight or density.

In one instance, an improved operation may be obtained with the use of contact elements designed as half spheres with or without additional perforation. In other instances, contact members may be of a thin hollow spherical shape provided with a number of relatively large openings that will preclude the retention of any contact liquid in the interior thereof. The half spheres or the perforate hollow spheres will thus provide low density means for forming a floating contact bed, while at the same time providing an increase in the surface area available to the liquid and gaseous streams without any problem of leakage or retention of a large quantity of liquid. The contact elements, may also be of a foam-like nature, where there is a rough surface and certain openings and internal voids extending below the surface of the element, to thus provide a light weight high surface area member.

In a broad aspect, the present invention in connection with the countercurrent contacting of gas and liquid streams within a confined contacting zone, where the gas stream flows upwardly and the liquid stream flows downwardly in such zone, while maintaining therein a floating and moving bed of light weight contact elements for the mutual contacting and dispersal of the gas and liquid streams, provides the improvement of using a given mass of formed elements in a manner which comprises, providing the latter as at least partially open elements that have a large surface area whereby they may be in a loose and mobile aerated bed and which contact elements thus provide both exterior and interior formed surfaces for contact with said countercurrently flowing streams.

It has been indicated hereinabove that the improved contact members shall be of a generally spherical form such as perforate spheres or half spheres, although, of course, there may be intermediate aspects where the elements are segments of spherical form members that are greater than a half sphere or somewhat less than a half sphere. A rounded or spherical form of member is, of course, of particular advantage in precluding the nesting or interlocking of elements when they are permitted to fall back to the support grid in a quiescent state. The elimination of nesting or interlocking of members thus permits such members to be readily aerated and floated when a contact unit is placed into operation. Sharp corners, which can wear or be subject to attrition, may be of disadvantage for the moving bed type of operation; however, the partially open formed elements or "spherical form" elements, as the term is used herein, may include polygonal shapes. In any event, it is not intended to limit the present improved operation and type of partially open contact element to the use of strictly spherical or hemispherical surfaces for, as will be hereinafter noted with reference to the drawings, there may be modifications in the edges of the half sphere to assist in avoiding the nesting of elements in either the turbulent or quiescent state. The elements may be formed of various types of materials, including but not limited to, polyolefins, polyurethanes, formed polystyrene, celluloid, hard rubbers, stainless steel, aluminum and wood or wood fibers, etc.

Reference to the accompanying drawings and the following description thereof will serve to further clarify the operation of the floating bed type of unit and improved forms of contact elements which may be used in connection therewith.

FIGURE 1 of the drawing is a diagrammatic sectional elevational view showing a contact chamber adapted to accommodate the countercurrent flow of gas and liquid streams in the presence of light weight open contact elements to provide turbulent floating bed contact between the two streams.

FIGURE 2 of the drawing indicates diagrammatically a modified form of contact element in the nature of a hollow sphere with relatively large wall perforations or openings.

FIGURE 3 of the drawing indicates diagrammatically a light weight thin-walled open hemispherical form of contact element.

FIGURE 4 of the drawing indicates a modified form of thin-walled contact element which has a greater thickness around the open edge or periphery to preclude tight nesting with the round surface of any adjacent element which may come into contact therewith.

FIGURE 5 of the drawing shows diagrammatically an open surface sponge type of contact element which may be used in lieu of a smooth surface element.

FIGURE 6 of the drawing shows diagrammatically an open surface and open interior type of light weight element which provides interior contact surface without sponge-like absorption of liquids.

FIGURE 7 shows in graph form the results of comparative tests between different members of open hemispherical contact elements versus non-perforate hollow spheres.

Referring now particularly to FIGURE 1 of the drawing, there is indicated a vertically disposed contact chamber 1 having gas inlet means 2 for introducing a gaseous stream which is to be scrubbed into the lower portion of the chamber. Scrubbed gas outlet means 3 is provided from the upper portion of the chamber above internal contacting zones 4 and 5, as well as above a packed mist extractor zone 6 within the upper portion of the chamber. Provision is made for the introduction of a suitable scrubbing liquid stream by way of line 7 and spray means 8. The latter is arranged to supply the scrubbing liquid over the entire area of the upper contacting zone 5, as well as perforate retainnig plate 9, such that there may be substantially uniform downward flow of liquid through the floating bed of contact elements 10 in both the contact zones 4 and 5. Suitable intermediate perforate plates or grids 11 and 12 will serve to divide the central portion of the contact chamber 1 into a plural number of zones for effecting the turbulent contacting between the gaseous and liquid streams; however, it is not intended to limit the use of this type of contact tower and improved contact elements to any predetermined number of separate stages or contact zones. Each contacting stage, as, for example zone 4, shall have an upper perforate plate or grid member, such as 11, to provide a top limitation for the floating bed of elements as well as a lower perforate plate or grid member 12 that provides a support for the light weight contact elements as they descend by gravity following a shutdown of the unit, or a temporary cessation of the gas stream flow. The lower portion of the contacting chamber 1 is provided with a liquid collection zone 13 and a liquid outlet nozzle 14 whereby collected particulate material and scrubbing liquid can be discharged from the scrubbing unit.

In the actual operation of the floating bed type of scrubbing unit, there shall be an adjustment between the gas and liquid flow rates, which in turn will be governed by the number of contacting stages, the number of elements in the unit and the like, such that there is a lifting of all of the contact elements from their respective lower support plate members and a resulting turbulence within the upper portion of each stage. Preferably, the gas flow rate is such as to lift all the contact elements against the upper perforate members of each zone while at the same time the liquid charge rate and supply means is such as to provide uniform downward flow through the zones 4 and 5 and effect the desired mutual contacting of liquid and gas on all the surfaces of the multiplicity of contact elements within the chamber.

As pointed out in the aforementioned Patent No. 3,122,594, this general type of floating bed scrubbing unit is especially designed to handle particulates which will foul a conventional type of column. For example, the gases may contain particles of alumina, tars, carbon and the like which it is desired to remove prior to the stream being discharged to the atmosphere. The liquid charge stream may be water, or in connection with special operations, an aqueous stream that may be slightly alkaline or acidic, depending upon the necessity for neutralizing collected material and liquid in the reservoir section of the chamber to in turn eliminate corrosion problems.

The mist extractor means 6 may comprise baffle plates, or alternatively, a particular type of mesh or packing material that is capable of coalescing entrained vapor and water droplets in the scrubbed gas discharge stream.

It should also be understood in connection with the present improved operation, utilizing the open form contact elements, that such operation should be controlled to avoid excessive gas flow or flooding. For example, if the gas velocity is permitted to be excessive in any given operation, there may be a situation where the liquid no longer tends to flow downwardly through the bed. In such case, the upper portion of the tower may tend to fill with the liquid being introduced by way of the spray nozzle means and the gas merely bubbles through the collected liquid without effecting the desired dispersed and intimate contact therewith. Also, where the region below a distributing grid of a contact stage becomes filled essentially with gas alone, there is tendency to lose the uniform floating bed action by the upward flow of the gas stream and the contact elements tend to fall to the lower grid of each stage while the stream bypasses them. In a preferred flow, the adjustment of gas and liquid flow rates permits the moving turbulent action of each of the contact elements against an upper retaining grid member for each contact zone and there is a mutual interchange and contacting of gas and liquid streams over the surfaces of each contact element. The wetted elements assist in agglomerating and holding entrained particulates so that they are removed from the gas stream being scrubbed while at the same time there is a constant washing away of accumulated particulate material such that the particles carry downwardly through the scrubbing chamber to successively lower zones and ultimately to the collecting reservoir 13 in the lower portion of the chamber where they are discharged therefrom with collected scrubbing liquid.

In a scrubbing operation of this type, with perforate internally open contact elements, there will be improved countercurrent contacting by virtue of the greater surface area, as well as the provision of contacts beds which seem to provide greater bed resistance. Those persons familiar with the floating bed type of scrubber units have found by experiment as well as by experience that the efficiency of a tower in operation appears to correlate itself with bed resistance or flow resistance through the one or more beds maintained in the tower. Greater quantities of contact elements will provide a greater resistance and resulting greater efficiencies of contact for carrying out the scrubbing operation. In addition, a tower with one or more contacting zones can be designed and operated to function as a countercurrent liquid-gas stream contacting zone in various manners with respect to the type of turbulence maintained therein. More specifically, the unit may utilize flow rates therethrough where a concentration of low density contact elements is maintained in constant agitation as a relatively compact floating bed and carried to the upper portion of each stage or zone and against the upper limiting grid plates. In another manner of operation, there may be a more turbulent type of contact with a diminished concentration of elements permitting increased throughput of liquid and gas. As a result, smaller diameter towers may be employed for a given scrubbing or reaction problem. In the latter type of operations there may be chemical reactions, heat exchange operations or gas absorption at low pressure drop conditions, concentration of solutions, rectification of liquids, etc.

In FIGURE 2 of the drawing, there is indicated diagrammatically a hollow sphere 15 which is designed and fabricated to have relatively large holes or openings 16 through its wall surface. The openings shall be of sufficient size as to permit free flow of the gas and liquid streams into the interior of the hollow member whereby there may be utilization of the entire interior surface. Also, as noted hereinbefore, the openings of an element shall be sufficiently large as to preclude the entrapment of any amount of liquid material which could add to the weight thereof and then raise the density of the individual contact member to a sufficient degree that would harm its being aerated and elevated as an element of the floating bed in the contacting unit. In an alternative construction, the spherical member 15 may have a segment of the outer wall surface removed such that there is less than a whole sphere as well as perforations through the remaining portion of the thin wall member. The plurality of elements may be constructed or formed of metals or of plastic and resin types of material. A uniform size and type of element may be used in any given contact zone to obtain a uniform floating bed action, with relatively thin wall surfaces utilized so as to retain a relatively low weight or density per element; however, at times, there may be an advantage to using varying sizes in one zone. The elements will generally have a diameter in the range of 1 inch to 2½ inches. On the other hand, in a turbulent bed contacting zone, there may be utilized formed elements of different densities whereby some of them tend to have random movement in the upper part of the contact zone while others of slightly greater density, or with some liquid absorption, will maintain a random movement in the lower portion of the contact zone.

In FIGURE 3 of the drawing there is indicated a simple thin walled hollow hemispherical member 17 which in operation would provide both exterior and interior surfaces for contact between liquid and gaseous streams. Here again, the hemispherical member 17 can be formed of varying types of materials and shall be fabricated to be relatively thin walled so as to form a light weight element that may be aerated or lifted as part of the floating bed type of operation. Also, perforations may be added through this hemispherical type of contact element.

In FIGURE 4 of the drawing there is indicated a modified form of hemispherical element 18 which has a thickened wall portion 19 around the open periphery thereof. By utilizing a thick wall portion such as 19 or by crimping the edge inwardly around the interior of the concave edge portion of the element, there will be less chance for the outer convex surface of any adjacent contact element from entry into and sticking against the interior wetted surface of an adjacent contact element during the time the elements are in the turbulent floating bed operation. Also, the small inside diameter provided by the thickened wall section 19 will preclude the outer convex wall portions from nesting into the interior portion of a element when the bed is permitted to fall downwardly into a quiescent state at the end of a contacting period.

FIGURE 5 of the drawing shows, in a diagrammatic or illustrative manner, a formed element 20, with openings 21, which has a porous, pitted or foam-like surface to give added surface area thereto and at the same time be of a light weight construction or formation. Although not shown in the drawing, this modified type of surface can also be made and utilized in connection with solid and hollow hemispherical forms of elements, or at least provide elements that are less than whole spheres. Actually, where the foam-like surface does not provide continuous channels to the interior of the element, it may be of a uniform nature; however, where the material is of a highly absorptive nature, then it should be open on the interior and have suitable openings, such as with the respective designs of FIGURES 2 and 3. These hollow sphere or hemisphere designs insure that there is no appreciable retention of liquid and prevention of movement by aeration. Also, various types of materials may, of course, be used with this form of element, including but not limited to, polyolefins, polyurethanes, foamed polystyrene, celluloid, rubber, etc. In contacting operations utilizing the elements in a turbulent random motion, there may be an advantage to using different density elements such that part of them will tend to circulate in the upper part of the aerated bed and a portion within the lower part of the bed. Thus, elements with a foam-like or porous absorptive surface could be used in combination with light weight smooth surface elements.

In FIGURE 6 there is indicated a cubical form of open foam-type of contact element 22 with a multiplicity of openings 23 such as may be produced from polyurethane and like materials. This type of material, when formed to have large open voids and passageways through the interior, will not be particularly absorptive and will be light in weight. In other words, in operation the downflowing liquid will run out of the elements as rapidly as it enters and there will be little, if any, loss in aeration.

In order to show diagrammatically the advantages obtained from the use of improved forms of partially open and partially spherical-form elements in carrying out a counter-current scrubbing or contacting operation, there has been a series of test operations which compare varying numbers of hemispherical contact elements with non-perforate hollow spheres. For this comparison, reference is made to the accompanying FIGURE 7 of the drawing which is in the form of a graph and relates to liquid flow rate, in gallons per minute (g.p.m.), versus bed resistance, in inches of water, for various floating bed depths. The test unit itself was constructed to have one square foot of cross sectional area and a height of 36 inches between grid members in the tower which served as the turbulent contacting zone for the light weight spherical form elements. An air stream was introduced into the lower end of the tower at a rate which provided a "break point" in each instance for the solid surface hollow spheres with respect to different liquid flow rates. The "break point" velocity is that velocity at which individual spherical balls or hemispheres rise and momentarily hold against the underside of a top grid and then fall back into the bed.

With particular reference to FIGURE 7, there is shown a curve or line "A" which results from the plotting of bed resistance against different liquid flow rates within the test chamber having the one square foot of cross section area and containing 360 conventional solid surface hollow plastic spheres. At rest, there was a bed height of about 8 inches and a freeboard thereabove of 28 inches. For the liquid flow rate of 15 g.p.m., there was a break point velocity of about 965 feet per minute (ft./min.) and a resulting bed resistance of 2.25 inches of water. At 30 g.p.m. there was a gas velocity of 865 ft./min. and a bed resistance of 2.45 inches of water. At 45 g.p.m. there was a break point velocity of 775 ft./min. and a resulting bed resistance of 2.85 inches of water. While at 60 g.p.m. of liquid flow there was a gas velocity of 670 ft./min. and a bed resistance of 3.05 inches of water.

A close comparative operation is shown in line "B" which results from the plotting of bed resistances found for each of the indicated liquid flow rates for a turbulent floating bed of open thin walled hemispherical members comprising 220 in number. The air flow rates found to provide the break point velocities for each of the liquid flow rates indicated were as follows: 1070 ft./min. with a 15 g.p.m. liquid flow rate; 870 ft./min. with a 45 g.p.m. liquid flow rate; and 775 ft./min. with a 60 g.p.m. liquid flow rate. The hemispheres used were actually of the same thin walled plastic material as the non-perforate hollow spheres provided in the test giving line "A." It may also be noted that the 220 hemispheres by virtue of their interior surface areas will provide a substantial equivalent in contact area to only 220 solid wall full spheres, while at the same time indicating an efficiency (based on bed resistance) that is comparative with the 360 whole spheres, resulting in the line "A" operation. Actually, in comparing the ratio of 220 half spheres to 360 whole non-perforate spheres there is only about one-third of the amount of material being used for the 220 hemisphere operation.

Line "C" shows the bed resistance found in connection with the use of some 720 open, thin walled hemispheres of the same type of material used for the other tests. In this case, the air flow rates which provided breakpoint velocities for the different liquid flow rates were determined as being substantially equivalent to those which provided the breakpoint velocities for the solid surface hollow spheres at the various given liquid flow rates. It will be noted that line "C" indicates a substantially higher bed resistance for each of the tested flow rates and, as a result, a showing that the 720 half spheres can provide a substantially greater contacting efficiency on the basis that it is known that increased efficiency follows increases in bed resistance.

In still another test operation, there was found a resulting line "D" from the use of a bed of 1100 hemispherical contact elements which were again of the same diameter and material as utilized in connection with the prior test operations for "B" and "C." Also, here again, substantially higher bed resistances were found with the greater number of hemispheres. In this instance, bed resistances were about double those found in the testing of the 360 conventional non-perforate hollow spheres.

Material-wise, 720 hemispheres would be equivalent to the 360 solid surface whole spheres being utilized for the test providing line "A," but it is quite obvious that the 720 hemisphere operation, as noted by line "C," provides far more resistance and efficiency for countercurrent gas-liquid contacting than the use of the conventional non-perforate spheres.

We claim as our invention:

1. In the countercurrent contacting of gas and liquid streams in a confined contacting zone, with the gas stream flowing upwardly in such contacting zone while maintaining therein a moving bed of light weight contact elements for the mutual contacting and dispersal of the gas and liquid streams, the improved method of effecting the countercurrent contacting of such streams with a given mass of formed contact elements, which comprises providing at least a portion of said formed elements in open hemispherical form having a large surface area whereby they may be lifted and fluidized in a loose and mobile aerated bed, and which contact elements thus provide both exterior and interior surfaces for contact with said countercurrently flowing stream.

2. The countercurrent contacting operation of claim 1 further characterized in that each of said hemispherical form elements is provided with a thickened internal wall portion around its edge, whereby tight nesting of elements is precluded.

3. The countercurrent contacting operation of claim 1 further characterized in that each of said hemispherical form elements has a plurality of wall openings.

4. The countercurrent contacting operation of claim 1 further characterized in that said hemispherical form elements have a high surface area foam-like surface.

References Cited

UNITED STATES PATENTS

| | | | |
|---|---|---|---|
| 598,351 | 2/1898 | Staub. | |
| 1,796,501 | 3/1931 | Berl | 261—94 |
| 2,253,261 | 8/1941 | Bacon | 261—94 |
| 2,639,909 | 5/1953 | Leva | 261—95 |
| 3,122,594 | 2/1964 | Kielback | 261—94 |
| 3,171,820 | 3/1965 | Volz | 261—94 X |
| 3,219,324 | 11/1965 | Williams | 261—95 |
| 3,233,660 | 2/1966 | Nettel et al. | |
| 3,266,787 | 8/1966 | Eckert | 261—94 |

FOREIGN PATENTS

| | | |
|---|---|---|
| 1,345,847 | 11/1963 | France. |
| 526,609 | 9/1940 | Great Britain. |

OTHER REFERENCES

Raschig: German printed application No. 1,051,814, March 1959.

HARRY B. THORNTON, *Primary Examiner.*

TIM R. MILES, *Examiner.*